United States Patent [19]
Walters et al.

[11] Patent Number: 4,788,419
[45] Date of Patent: Nov. 29, 1988

[54] TICKET PROCESSING TERMINAL WITH A SINGLE-CYLINDER TICKET ADVANCING MECHANISM

[75] Inventors: James T. Walters, Oceanside; Paul M. Volpini, San Diego; Edward A. Hoppe, Oceanside; Colin J. Gardyne, San Diego, all of Calif.

[73] Assignee: International Totalizator Systems, Inc., San Diego, Calif.

[21] Appl. No.: 909,507

[22] Filed: Sep. 19, 1986

[51] Int. Cl.$^4$ .............................................. G06F 7/08
[52] U.S. Cl. .................................... 235/381; 235/480; 209/657
[58] Field of Search ............... 235/480, 381, 379, 477; 209/656, 583, 569, 534, 657, 563–566

[56] References Cited

U.S. PATENT DOCUMENTS

| | | | |
|---|---|---|---|
| 3,430,033 | 2/1969 | Reed | 235/480 X |
| 3,508,032 | 4/1970 | MacDuffee et al. | 235/61.11 |
| 4,251,000 | 2/1981 | Templeton | 209/547 |
| 4,626,672 | 12/1986 | Sapitowicz et al. | 235/480 |
| 4,704,518 | 11/1987 | Brunn et al. | 235/480 |

OTHER PUBLICATIONS

Datamark Maintenance Manual DM—4D–Terminal System; vol. I; pp. 4–4, 4–22 through 4–36; International Totalizator Systems, Inc. (1984).

Primary Examiner—Roy N. Envall, Jr.
Attorney, Agent, or Firm—Brown, Martin, Haller & Meador

[57] ABSTRACT

A ticket processing terminal includes a cylindrical ticket guide around which tickets are driven by a single drive cylinder which rotates in the ticket guide. An entry port, a feed port, and an exit port all connect to the ticket guide in a spaced relationship around the guide. Raed/write mechanism are placed adjacent the guide at a position which is passed by a ticket entering the guide through the entry or feed port and before the exit port is passed. Tickets are issued by the terminal by providing information to the write mechanism from an external source, feeding a ticket into the guide from either the feed port or the entry port, writing the information on the ticket, reading the printed information for validation, and then diverting the ticket to the exit port before completing a revolution. After being issued, a ticket bearing written information can be processed by the terminal for cancellation. When being cancelled, a ticket is fed into the ticket guide through the entry port, advanced past the read mechanism where the information on the ticket is read, advanced on a complete revolution of the ticket guide past the exit port, cancelled by the write mechanism, and then diverted from the ticket guide through the exit port before completing the second revolution of the ticket guide.

17 Claims, 1 Drawing Sheet

TICKET PROCESSING TERMINAL WITH A SINGLE-CYLINDER TICKET ADVANCING MECHANISM

BACKGROUND OF THE INVENTION

The present invention is in the field of ticket processing and issuing, and more particularly concerns a ticket processing terminal with a single-cylinder advancing mechanism for advancing a ticket through successive stages of ticket processing.

In the prior art, ticket advancing mechanisms have been used in ticket terminals for moving a ticket through various stages of processing in a terminal. For example, the DM-4 Datamark ticket issuing terminal, manufactured and sold by the assignee of this patent application, includes a ticket advancing mechanism having a pair of spaced-apart, parallel ticket rollers which move a ticket in a figure-eight pattern for processing on both sides of the ticket. By processing is meant the writing of information onto and reading of information off of one or more faces of a ticket. The ticket advancing mechanism of the Datamark terminal can be understood with reference to U.S. patent application No. 670,156 (now U.S. Pat. No. 4,677,553), which is assigned to the assignee of the subject patent application and incorporated herein by reference.

Other mechanisms for feeding documents during processing of the documents are exemplified in U.S. Pat. No. 3,508,032 of MacDuffee et al. and U.S. Pat. No. 4,251,000 of Templeton. In the MacDuffee patent, a document is fed along a longitudinal path, written on, guided onto an exit path which is perpendicular to the feed path, and fed from the exit path. No provision is made in the MacDuffee system for reading information on the printed card. The Templeton system concerns an apparatus for reading documents at a high speed along a substantially linear pathway.

When the need exists for printing a document and then reading what has been printed in order to verify the printing, it should be evident that devices in which ticket processing is conducted along a linear ticket path must be provided with increased path lengths or reciprocating mechanisms to accommodate the added processing functions.

An effort to maximize the processing functions, while minimizing the ticket processing path length in a ticket processing terminal, is well represented by the DM-4 Datamark terminal of the assignee. The DM-4 terminal is especially significant in that the compact figure-eight ticket pathway permits processing on both faces of a ticket. However, in applications where extreme compactness of a terminal is required, the requirement for two drive rollers to form the ticket processing pathway might limit the use of the DM-4 terminal.

Therefore, there is an evident need for a ticket terminal with a processing mechanism which will further reduce the size of the terminal by minimizing the space required for movement of a ticket undergoing processing, yet which permits the terminal to retain as many ticket processing functions as possible.

It is therefore an object of the present invention to provide a compact yet multifunctional ticket advancing mechanism.

It is a further object of the present invention to provide a compact ticket advancing mechanism having a processing pathway of length sufficient to perform a multiplicity of ticket processing functions.

SUMMARY OF THE INVENTION

The invention is founded upon the critical observation that a single circular pathway can be used to process at least one side of a ticket by permitting the ticket to circulate for as many revolutions of the pathway as are required to perform all of the necessary processing steps. The single, circular ticket pathway minimizes the size of the ticket advancing mechanism, and thus reduces the size of the ticket processing terminal in which the ticket advancing mechanism resides.

The invention is expressed as a ticket processing terminal having a housing, a substantially circular ticket guide in the housing, and a single drive cylinder conforming to and enclosed by the ticket guide for driving a ticket in a feeding direction in the guide. The terminal includes an entry port for receiving a ticket and for admitting a received ticket into the ticket guide in the feeding direction. A feed port, offset from the entry port, feeds a blank ticket into the ticket guide in the feeding direction; co-located reading and writing mechanisms are placed adjacent the ticket guide for reading or writing information on a ticket received through the entry or feed port. The reading and writing mechanisms are displaced from the feed port in the feeding direction by a first arcuate distance. An exit port, displaced from the feed port in the feeding direction by a second arcuate distance greater than the first arcuate distance, conducts tickets from the ticket guide. A positionable diverter means is placed in a location for controlling the exit port and is conditioned by a positioning signal for moving to a first position to divert a ticket from the ticket guide to the exit port or to a second position to guide a ticket in the ticket guide past the exit port in the feeding direction. Operations of the terminal are orchestrated by a terminal control apparatus connected to the entry port, the drive cylinder, the diverter means, and the reading and writing mechanisms for providing the drive and positioning signals. The terminal control apparatus includes a drive cylinder control apparatus responsive to the entry port, the feed port and the exit port for providing a drive signal between a first time when a ticket enters the ticket guide through the entry port or feed port and a second time when a ticket is conducted through the exit port. A reading and writing control apparatus selectively operates the reading and writing mechanisms to read or write in response to the driving of tickets in the ticket guide. A feed port control apparatus is provided for selectively causing the feed port to feed a ticket. Finally, a diverter control apparatus responds to the drive control and reading and writing control apparatuses by conditioning the positioning signal in synchronism with the reading and writing of tickets being driven in the ticket guide.

It will become evident that the above-stated goals and other attendant advantages of the invention are realized when one reads the detailed description of the invention together with the below-described drawings.

DETAILED DESCRIPTION OF THE PREFERRED EMBODIMENTS

Figure 1:
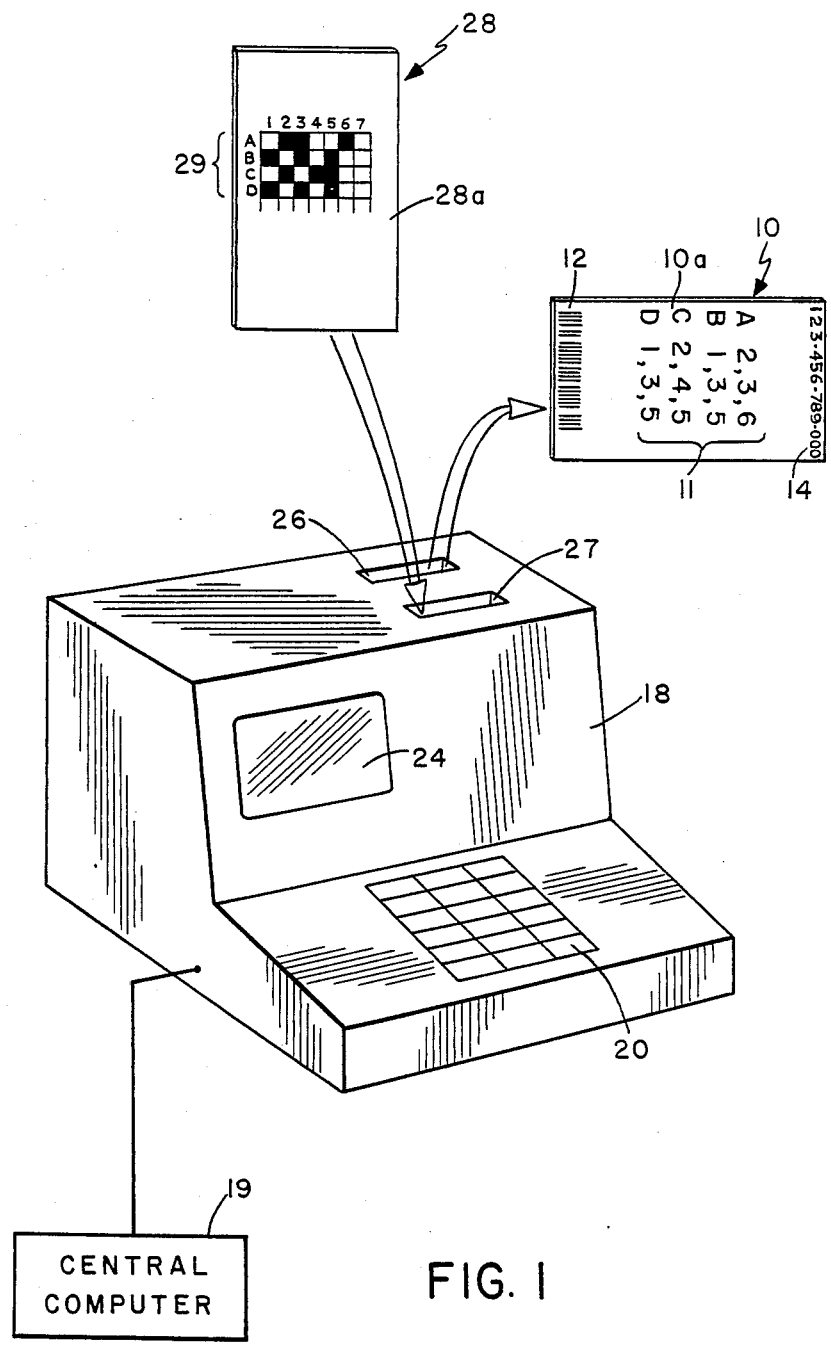
FIG. 1 is an illustration of the operative environment in which the invention finds use.

In FIG. 1, the operative environment of the invention is illustrated. In FIG. 1 a ticket issuing system issues a ticket 10 which bears certain information reflecting the completion of a transaction. For example, the information may be contained in an information field 11, a bar code field 12, and a serial number 14. In the information field 11, four separate transactions A, B, C, and D are indicated, with transaction parameters in horizontal list format beside each transaction. For example, transaction A may indicate one bet involving the selection of win, place, or show horses in a horse race. The other transactions, B, C, and D, represent three other bets for the same race. The bar code field 12 includes a bar code representation of the numerically-printed serial number 14. In automated betting systems, the serial number 14 represents a unique identification of the betting transaction conducted between the holder of the ticket 10 and the system.

The betting system includes a plurality of terminals connected to a central system processor according to standard time-sharing, multiprogramming, or multiprocessing techniques. Although in FIG. 1 only one terminal, the terminal 18, is shown connected to a central betting system control computer 19, it is understood that a plurality of other terminals equivalent to the terminal 18 are also connected to the central computer 19.

The terminal 18 is standard and includes operator input/output devices such as an alphanumeric keyboard 20 and a CRT display screen 24. The terminal 18 issues tickets through an exit port 26. The terminal 18 also has the capacity of receiving tickets through an entry port 27. In the prior art, the port 27 is used to accept a previouslyissued ticket which has had information written on it for validation of a transaction. For example, the ticket 10 may have correct win, place, show combinations for one or more races which the bettor presents to the operator of the terminal 18 for payment. In the prior art, betting information is entered by the terminal operator through the keyboard 20. The information is sent to the central computer which accepts and saves the transaction information. Then, an issue command is sent to the terminal by the central computer causing a printing mechanism in the terminal to print betting transaction information on the ticket. When the ticket 10 is issued, a record of the transaction information is stored in the betting system central computer 19 in conjunction with the ticket serial number.

If the ticket holder has one or more correct combinations, the bettor presents the ticket 10 to the operator of the terminal 18, who inserts the issued ticket into the entry port 27. The terminal 18 has the capacity for reading the information and transmitting it to the betting system control computer 19 for verification of the winning bets. The betting system central computer 19 verifies bets by receiving the serial number of the ticket entered through the entry port, retrieving the betting information stored in association with the serial number, verifying the winning subtransactions stored with the serial number, and sending back verification and cancellation signals to the terminal 18. The terminal 18 responds to the verification and cancellation signals by verifying visually to the operator on the CRT 24 the winning payout amounts and printing a cancellation on the ticket 10. The cancelled ticket 10 is then provided through the exit port 26 and kept by the operator as a payout receipt. The cancellation will prevent a second payoff after an initial one has been made.

In the system represented by FIG. 1, it is understood that the betting system central computer 19 is located at a position that is remote from the terminal 18 and has the capacity of engaging in data communications with the terminal. This is provided, for example, by the use of interactive modems under the control of a multi-user communications facility in the betting system central computer 19.

With regard to the invention, it is desired to reduce the size of the terminal 18 to an absolute minimum without surrendering any of the just-described prior art transactional functions. In addition, it is desired to support a second mode of transaction information input in response to tickets prepared by a bettor. For example, the ticket 28 has on the ticket face 28a a conventional information entry field 29 consisting of a two-dimensional matrix of entry locations. The horizontal dimensions of the entry field 29 correspond to the separate bets A, B, C, and D, while the vertical dimensions correspond to the horses chosen for each bet. The bettor indicates horse selection for a bet by filling in, for example with a pencil, the boxes corresponding to the horses on which he desires to bet during the race. Thus, in row A, corresponding to the first bet, the bettor has marked horse numbers 2, 3, and 6, which correlates with the information in subtransaction A of the issued ticket 10. As explained below, the invention permits the system of FIG. 1 to accept the information on the bettor-marked card 28 by reading the information, storing it in the fashion understood for the prior art, and issuing the ticket 10 to memorialize the betting transaction. In this regard, the ticket 28 bearing the bettor-entered information is fed into the terminal 18 through the entry port 27, the information on the ticket is read, communicated to the betting system control computer 19, which assigns the transaction a serial number and stores the information in conjunction with the serial number. The system then is enabled to issue the ticket 10, which is printed with the conventional format illustrated in FIG. 1 and described above.

Figure 2:
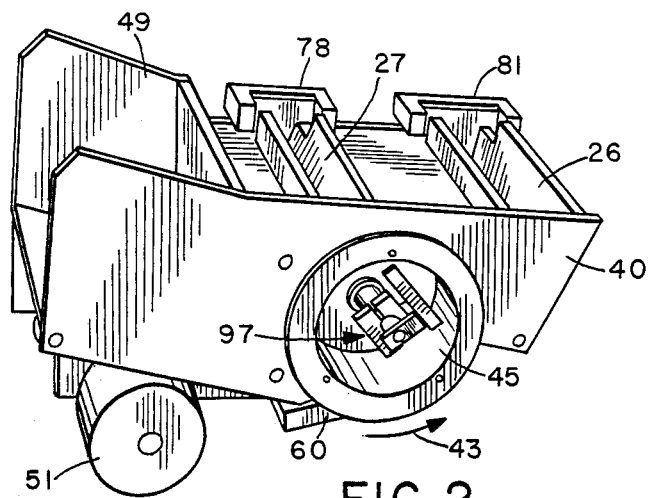
FIG. 2 is a perspective view of the ticket advancing mechanism of the invention.
Figure 3:
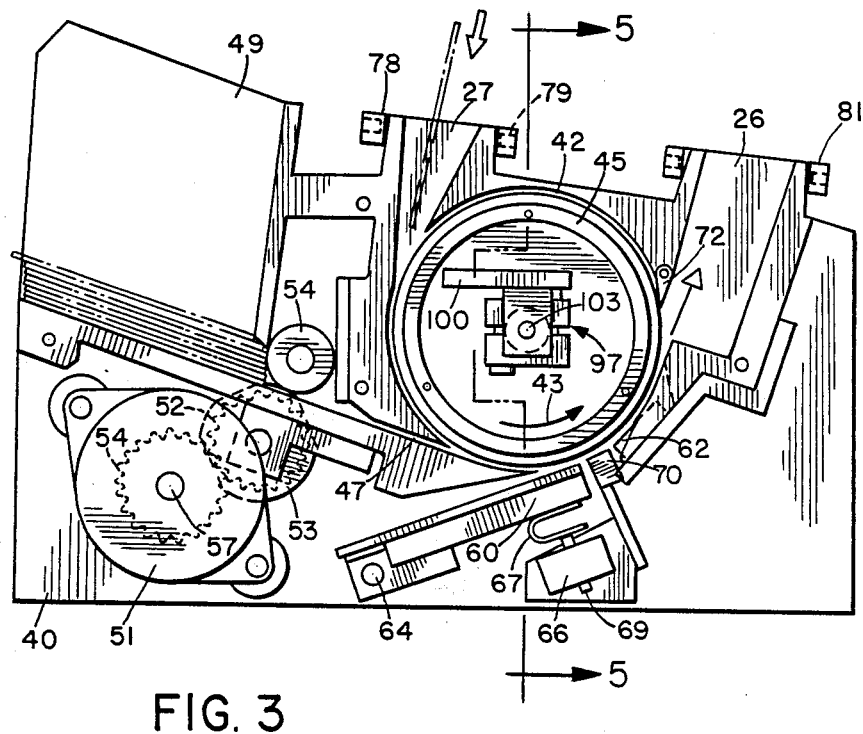
FIG. 3 is a side elevation of the mechanism with a side plate removed.

FIGS. 2 and 3 illustrate the ticket advancing mechanism in the terminal of the invention, which can be used, for example, in the FIG. 1 system. As will become manifest from the discussion which follows, the ticket terminal with the described ticket advancing mechanism is a compact polyfunctional device which can result in reduction in the bulk of the terminal 18 without decreasing its functionality.

The ticket processing terminal includes a housing 40 which defines a cylindrical or circular ticket guide 42. A ticket is advanced along a revolutionary path around the ticket guide 42 in a feeding direction indicated by the arrow 43. The force for driving a ticket on the circular path of the ticket guide 42 is provided by a rotating drive cylinder 45. Tickets are admitted to the ticket guide 42 through either the entry port 27 or a feed port 47. In the first instance, a ticket is manually advanced through the entry port 27 until its forward edge is nipped between the drive cylinder 45 and the ticket guide 42. At this point the ticket is frictionally engaged between the cylinder and guide and driven in the feeding direction indicated by the arrow 43. A ticket enters the guide 42 through the feed port 47 from a ticket hopper 49, in which a plurality of blank tickets are held. A ticket is fed from the hopper 49 through the port 47 by the combination of the stepper motor 51, drive gear 54, drive gear 52, and feed roller 53. The drive gear 54 rotationally couples the shaft 57 of the stepper motor 51 to the drive gear 52 and feed roller 53. Thus, when the stepper motor 51 is energized, its shaft rotates, the rotation being transmitted by the drive gears 54 and 52 to the roller 53. When the feed roller 53 rotates, a ticket in the hopper 49 is nipped between it and the follower roller 54 and driven thereby through the feed port 47 into the ticket guide 42. When the forward edge of a ticket advances far enough through the feed port 47, it is frictionally engaged between the ticket guide 42 and the drive cylinder 45 and driven in the direction of the arrow 43 through the guide 42.

Ticket processing in the ticket guide 42 is implemented by a thermal printer 60 and a dual-function reading mechanism 62. The dual-function mechanism 62 includes the function of a conventional bar-code reader and a conventional mark-sense reader. In this regard, both readers employ optical means to read respective kinds of data visibly imprinted on a ticket. A bar code reader observes and converts a conventional bar code having the form of the field 12 on the ticket 10 of FIG. 1 into a string of digital signals. Similarly, a mark-sense reader interprets the marks in the mark location matrix 29 of the ticket 28 and converts those marks into another string of digital signals.

The dual-function reading mechanism 62 is maintained in a fixed position relative to the ticket guide 42. However, the thermal printer 60 is pivoted into and out of printing engagement with a ticket on a pivot pin 64. Pivoting action is provided by a solenoid 66 and operating spring 67, which is attached to the thermal printer 60. In operation, when the solenoid 66 is activated, its piston 69 moves against the operating spring 67, thereby pivoting the thermal printer 60 against a ticket in the ticket guide.

The thermal printer is a conventional dot-row mechanism operated in synchronism with the drive cylinder 45. When a row of dots is to be printed, the drive cylinder 45 is rotated by the amount necessary to bring the ticket to the proper print location. The printer solenoid is activated, as is the printhead, resulting in a row of dots on the ticket. The ticket is then advanced to the next location by rotation of the drive cylinder and another row of dots is printed.

Reading and writing functions are synchronized to the movement of a ticket in the ticket guide 42 by the ticket under printhead (TUP) sensor 70. The TUP sensor 70 is a conventional optical sensor providing a two-state signal. The sensor 70 conditions the signal to one state for as long as a ticket intercedes between it and the drive cylinder 45. The signal is deactivated when there is no ticket between the sensor 70 and the cylinder 45.

Figure 4:
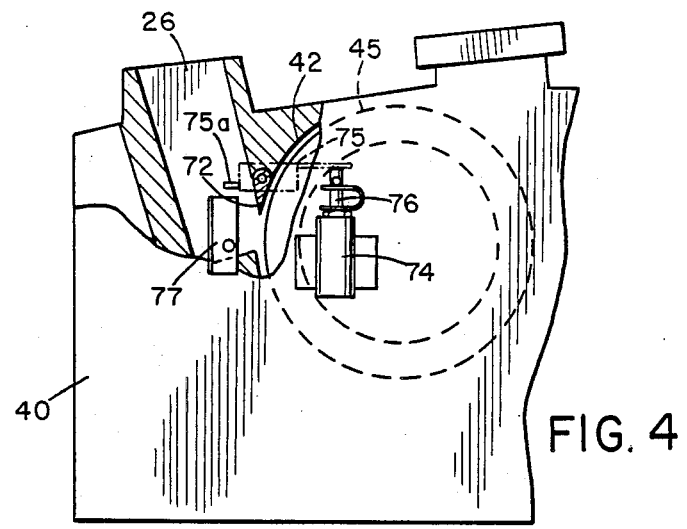
FIG. 4 is a view of a portion of the other side of the mechanism with the side wall cut away.

A ticket is maintained in the ticket guide 42 or diverted to the exit port 26 by the action of a solenoid-driven diverter gate 72. The diverter gate 72 has two positions: a first position for diverting a ticket into the exit port 26, and a second position for maintaining a ticket in the ticket guide 42. The diverter gate 72 is shown in the first position in FIG. 3 and the second position in FIG. 4. In the first position, the diverter gate is moved toward the drive cylinder 45 so that the forward edge of a ticket being driven in the guide 42 engages the edge of the diverter gate 72 and is driven upwardly through the exit port 26. As shown in FIG. 4, in its second position, the diverter gate is pivoted toward the exit port 26, away from the drive cylinder 45 so that the forward edge of a ticket contacts the inside of the diverter gate 72 and is guided thereby into the upper portion of the ticket guide 42.

FIG. 4 shows a portion of the backside of the ticket mechanism of FIG. 2, and is intended to illustrate how the diverter gate 72 is operated. The diverter gate is pivotally connected to the housing 40 to enable it to pivot between the two positions. Pivoting action is provided by a solenoid 74 and a pivoting arm 75. The solenoid 74 has a piston 76 which is activated to its withdrawn position when the diverter gate 72 is to be driven to its second position. The unactivated or default position of the solenoid piston 76 causes the diverter gate 72 to assume its first position. A hall-effect magnetic sensor 77 senses which position the diverter gate 72 is in by detecting the proximity of a magnet 75a carried on the arm 75.

Operational synchronization of the ticket advancing mechanism of FIGS. 2 and 3 is supported by a pair of optical presence detectors 78 and 81. The detector 78 is positioned at one side of the entry port 27 while the detector 81 is at the corresponding side of the exit port 26. The detector 78 responds to a light-emitting diode 79 which provides a continuous beam of light detected by a photodetector 78. When a ticket is inserted into the entry port 27, the beam of light is interrupted, with the interruption being indicated by a change in signal output by the photodetector 78. Synchronization of the operation of the mechanism to the insertion of a ticket through the port 27 is afforded by the output of the sensor 78. Similarly, the output of the detector 81 (which operates identically with the detector 78) is used to detect and indicate the presence of a ticket in the exit port 26.

It is of importance that the printer 60 and reading mechanism 62 are located between the entry and feed ports, on the one hand, and the exit port, on the other hand. In fact, in the feeding direction the printer and recording mechanism are displaced by smaller arcuate distances from the feed and entry ports than the exit port. This permits a ticket to be immediately diverted from the ticket guide 42 into the exit port 26 immediately after a reading or writing operation. The result is that a ticket will spend less time being driven in the ticket guide 42 during processing, thus increasing the speed of operation of the ticket advancing mechanism of the invention.

Figure 5:
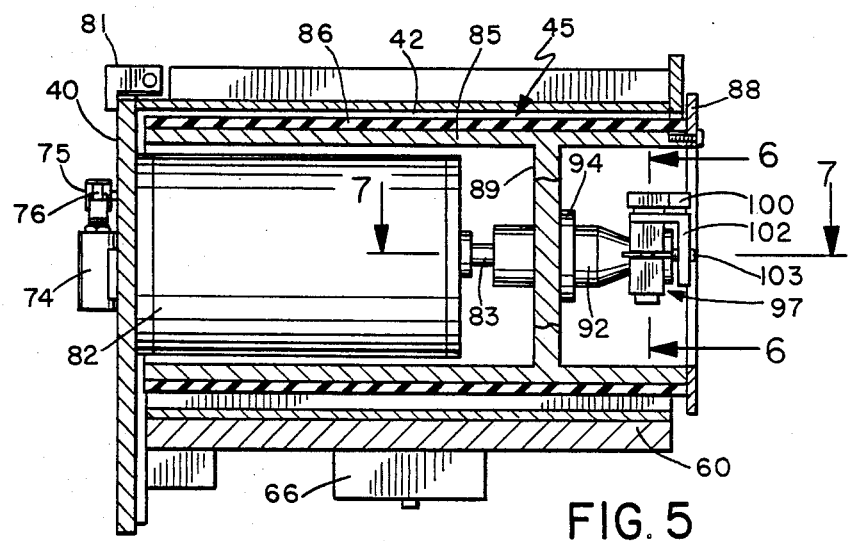
FIG. 5 is a sectional view taken along lines 5—5 of FIG. 3.
Figure 6:
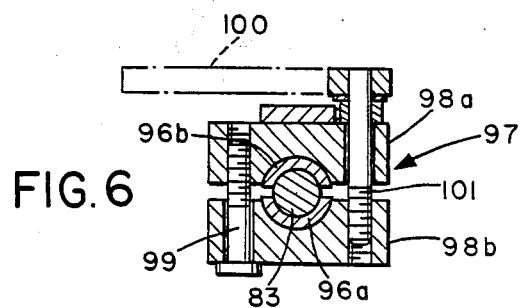
FIG. 6 is an enlarged sectional view taken along line 6—6 of FIG. 5.
Figure 7:
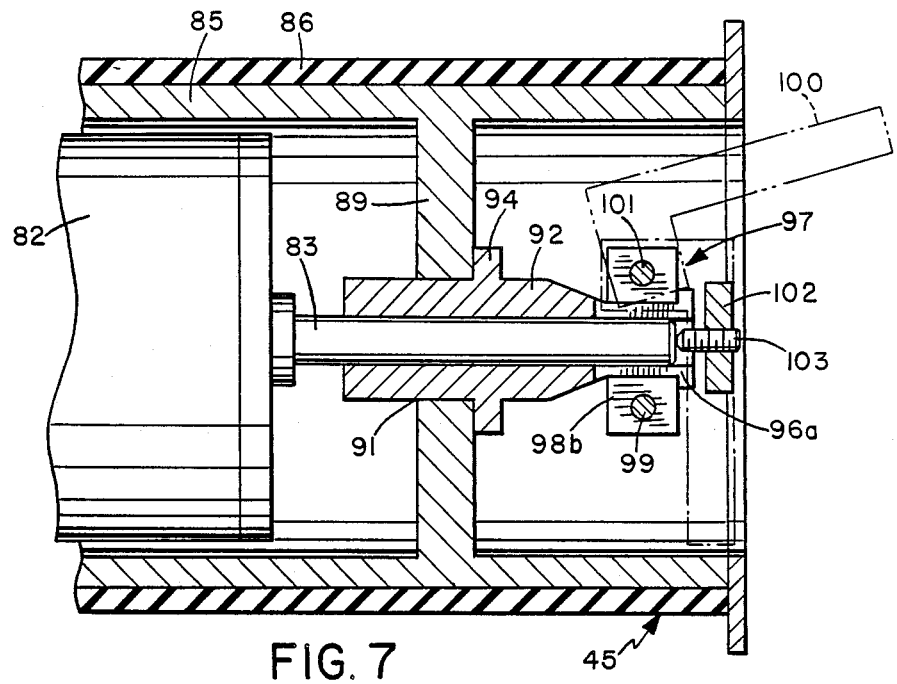
FIG. 7 is an enlarged sectional view taken along line 7—7 of FIG. 5.

Other structural details of the ticket advancing mechanism that are of importance in achieving the goals of the invention are illustrated in FIGS. 5, 6, and 7. As shown in FIG. 5, the drive cylinder 45 is rotatably disposed in the cylinder forming the ticket guide 42. A motor 82, mounted conventionally to the housing 40, provides rotary motion to and suspension of the cylinder 45. The motor 82 is a conventional electronically controlled, electrically powered stepper motor having a drive shaft 83. The motor 82 has a generally cylindrical cross section. The drive cylinder 45 consists of a machined metallic cylinder 85 whose outside surface is enclosed in a close-fitting rubber sheath 86. The rubber sheath 86 enables the drive roller 45 to frictionally engage and drive a ticket in the ticket guide 42. The ticket is held in lateral position on the drive roller outer surface by an end cover 88. The drive roller cylinder 85 is a hollowed-out, machined piece with a web 89 that divides the cylinder into forward and rear portions.

The motor 82 is fixed with respect to the housing 40 and ticket guide 42. The rear portion of the drive cylinder 45 encloses the motor, while the cylinder is rotatably disposed in the ticket guide by attachment to the motor's drive shaft 83. Thus, the ticket guide 42, drive cylinder 45, and motor 82 form a nested, coaxial arrangement that substantially minimizes the structural volume of the ticket advancing mechanism necessary to provide ticket advancement and functional diversity of the terminal 18.

Referring now to FIGS. 5 and 7, the web 89 has an axial aperture at 91 through which a cylinder hub 92 is press fitted. The hub shoulder 94 provides a stop which positions the hub 92 against the web 89. The forward portion of the hub 92 forms a flanged collet 96. The collet flanges are indicated by 96a and 96b in FIG. 6. The drive cylinder 45 is mounted to the shaft 83 of the motor 82 by the hub. The hub 92 is centrally bored so that the hub and attached drive cylinder slide over the shaft 83 far enough for the collet 96 to substantially ensheath the end of the drive shaft 83. The hub and drive cylinder are releasably locked to the shaft 83 by the locking mechanism 97. The locking mechanism 97 compresses the collet flanges 96a and 96b until they lock to the end of the drive shaft 83. The locking mechanism 97 is shown in detail in FIG. 6 and in operative application in FIGS. 5 and 7. The locking mechanism 97 consists of a pair of rectangular clamp halves 98a and 98b which are concentrically bored and threaded near their ends. One set of aligned concentric bores accepts a set screw 99 which is tightened to bring the two clamp halves 98a and 98b together over the collet 96. The other set of concentric bores in the clamp halves accept a locking lever 100 having a threaded extension 101 which engages the threads in the clamp half 98b. The threads of the extension 101 are advanced in the threaded bore of the clamp half 98b to the point where a partial turn of the locking lever 100 in one direction will cause the clamp halves to compress the collet flanges 96a and 96b enough to tightly engage the end of the drive shaft 83. A partial turn in the other direction will spread the clamp halves sufficiently to disengage the collet flanges from the drive shaft 83 and permit the drive cylinder 45 to be removed from the shaft.

The drive cylinder 45 is prevented from advancing into frictional engagement with a portion of the housing 40 upon which the motor 82 is mounted by the stop assembly consisting of the L-shaped bracket 102 and set screw 103. The bracket is fixed to the clamp half 98a by brazing or soldering. The set screw is advanced through a threaded bore in the bracket 102 a distance which is sufficient to permit the set screw 103 to touch the tip of the drive shaft 83 while preventing the end of the drive cylinder 45 from frictionally contacting the housing 40.

Figure 8:
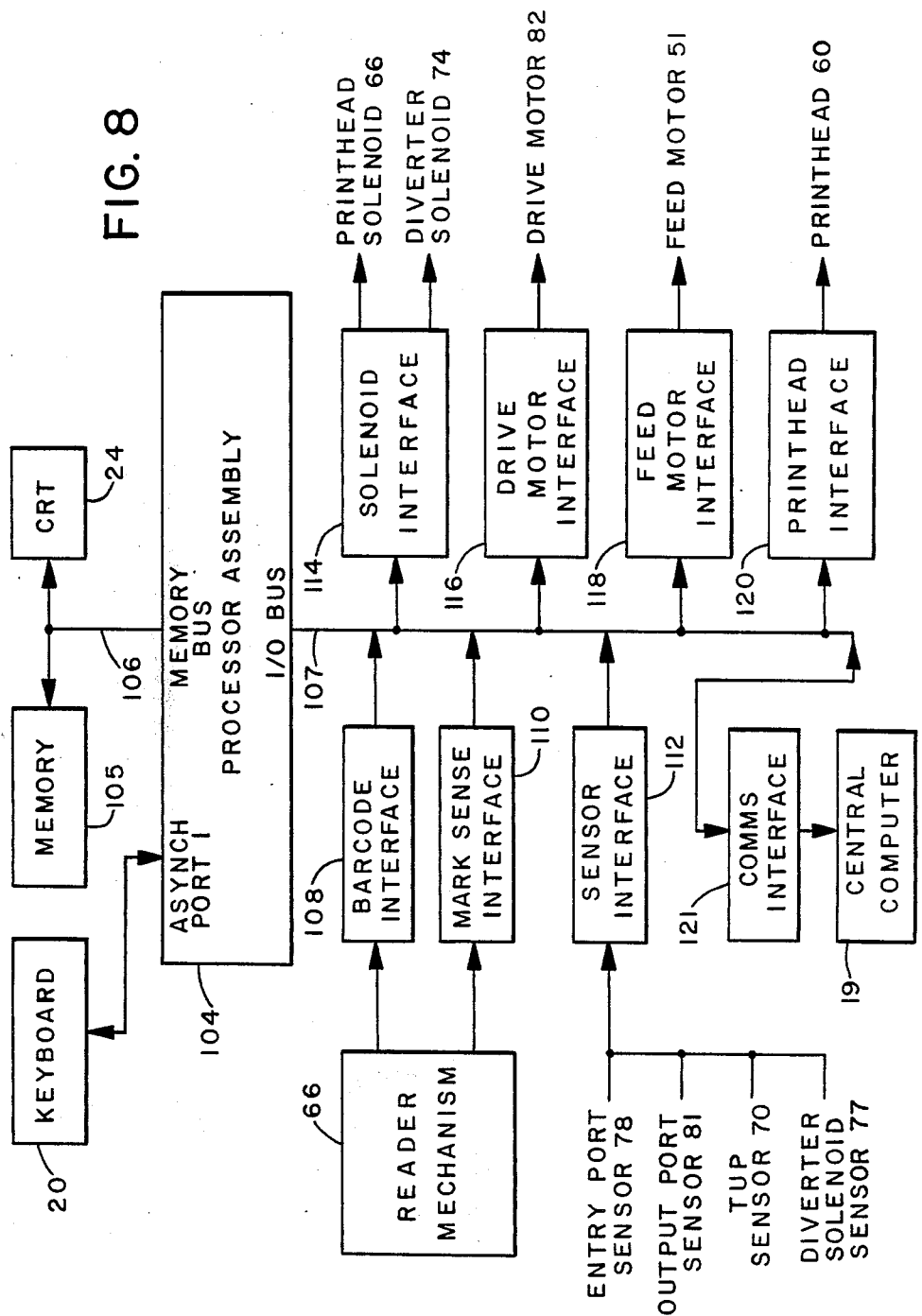
FIG. 8 is a block diagram of the terminal control unit which controls the operations of the ticket advancing mechanism of the invention.

FIG. 8 illustrates the mechanization used to electronically control the operations of the ticket advancing mechanism of the invention. The control mechanization includes a processor assembly 104 connected to a memory 105 on a memory databus 106 and to various control interfaces on an input/output (I/O) databus 107. The processor assembly is conventional and, in the preferred embodiment, includes two commercially-available, programmable microprocessors. The processor assembly includes an asynchronous, half-duplex data port (ASYNCH port1), a bi-directional memory databus port, and a bidirectional I/O bus port. The asynchronous port is used to support conventional asynchronous data exchange between the keyboard 26 and the microprocessor assembly 109. Asynchronous data transfer is carried out between the processor assembly 104 and the keyboard using any available message exchange technique. Communications with the keyboard 26 involve the entry of data and commands for ticket processing as described below.

The memory bus 106 connects not only to the memory 105, but also to the CRT 24 of the terminal 18. The memory bus is used by the processor assembly 104 to utilize the memory 105 during conventional data processing operations and also to transfer display data to the CRT 24 for the display of responses to transactions conducted through the terminal 18.

The purpose of the I/O databus 107 is to provide conventional input and output channel access to various components of the ticket advancing mechanism; the input and output channels are conventionally employed to synchronize and control the operations of the mechanism's components and to support communications with the central computer 19. Of course, control and synchronization of operations and communications are orchestrated by a program in the processor assembly, whose primary features and functions are described below.

Input channelization is provided over the I/O bus 107 through a bar code interface 108, a mark sense interface 110, and a sensor interface 112. Output channelization is supported by a solenoid interface 114, a drive motor interface 116, a feed port motor interface 118, and a printhead interface 120. Each interface represents a hardware boundary between one or more ticket advancing mechanism components in the processor assembly 104. The interfaces 108, 110, 112, 114, 116, 118 and 120 can comprise one or more conventional hardware components such as an I/O expander. The bar code interface 108 and mark sense interface 110 link the respective components of the reader mechanism 66 to the processor assembly 104, enabling the assembly to receive, format, and forward to the central computer 19 data written on tickets. The sensor 112 collects respective signals from the entry port sensor 78, the output port sensor 81, and the TUP sensor 70 to enable the processor assembly program to determine the location of a ticket being driven through the ticket advancing assembly. The sensor interface 112 also is connected to receive the current state of the diverter solenoid sensor 75.

The solenoid interface 114 channels control signals from the processor assembly 104 to the printhead solenoid 66 and diverter solenoid 74. Control signals to operate the drive motor 82 are provided by the processor assembly 104 through the drive motor interface 116. The feed port motor interface 118 channels the feed port motor control signals from the assembly 104 to the motor 51. Finally, data to be written on a ticket is channeled through the printhead interface 120 to the printhead 60.

Bidirectional communication with the central computer 19 is carried out directly with the central computer 19 through a communications (COMMS) interface 121 connected to the bus 107. Message exchange between assembly 104 and the central processor 19 involves the registration, storage, and the validation of ticket data, as described above with respect to the prior art application of the terminal 18.

It will be evident to those well-versed in the art that the control mechanization of FIG. 8 can be conventionally mounted on one or more printed circuitboards located within the chassis of the terminal 18 and connected by conventional signal conduction means to the various components of the ticket advancing mechanism of the invention.

The operations of the ticket advancing mechanism of the invention are realized through the programming of the processor assembly 104. A first ticket processing operation, summarized in FIG. 9, involves the use of the keyboard 20 for entry of data and commands and the central computer 19 for registration, storage, and validation of ticket data. A ticket processing operation starts in step S1 by waiting for a ticket transaction command entered from the keyboard 20. When a ticket transaction command is received from the keyboard 20, the positive exit is taken from step S2. In this regard, a ticket transaction command can involve the printing of betting data onto a ticket, with the data being communicated orally from a bettor to the operator of the terminal 18 and entered into the terminal by way of the keyboard 20. In this example, the transaction then will consist of entry of the betting data on the keyboard and a transaction command from the keyboard to begin a process of registering and validating the transaction information and then printing the information on a ticket.

Figure 9:
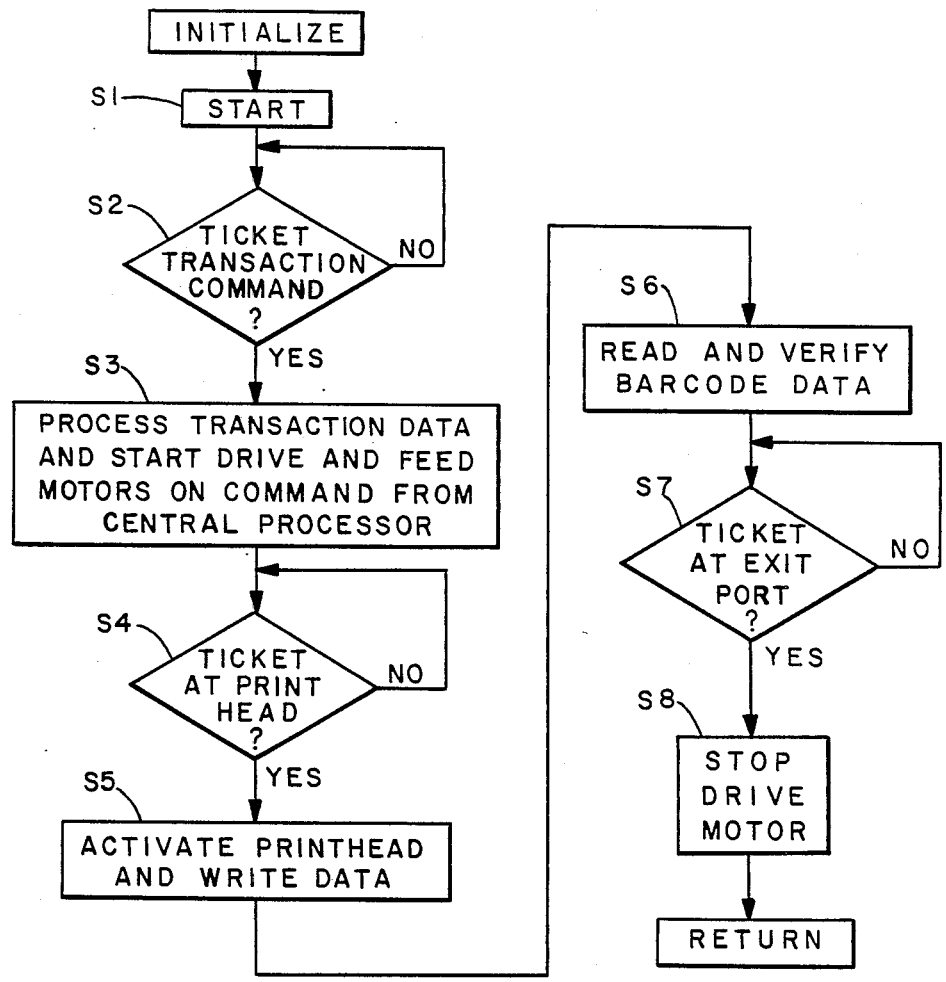
FIG. 9 is a flow diagram showing a sequence of operations characterizing a first operational application of the invention.

Thus, when the positive exit is taken from step S2 of FIG. 9, the transaction data, in this case betting selections, are processed in step S3. Processing in this respect consists of providing the betting data to the central computer 19 so that the computer can generate a serial number identifying the transaction, store the data in conjunction with the serial number, and transmit the serial number back to the terminal for printing on the ticket. Once the serial number is received from the central computer 19, the processor assembly 104 activates the drive motor 82 and feed motor 51. This causes a blank ticket to be fed from the hopper 49 through the feed port 47 and advanced in the ticket guide 42 in the feeding direction. When the ticket reaches the printer 60, as indicated by a signal from the TUP sensor 70, the positive exit is taken from step S4. In step S5, the thermal printer 60 is activated and betting transaction data entered through the keyboard and the serial number received from the central processor are written on the ticket. In this step, the feed motor 51 is turned off and the drive motor 82 is step-advanced in synchronism with the writing operation executed by the thermal printer 60. Concurrent with the writing operation, the bar code component in the reader mechanism is activated to read the data printed on the ticket in step 56. The data obtained from the bar code reader is provided to the processor 104 for verification. If the information read from the ticket does not correspond to information stored in connection with the serial number of the ticket, the processor assembly 104 will provide a message to the terminal operator, which will be displayed on the CRT 24. The terminal operator will either keep the ticket or provide it to the bettor according to the outcome of the verification step. Since the diverter gate 72 has been placed in its first position, the ticket is diverted from the ticket guide into the exit port 26. As the ticket advances up through the exit port 26, it will eventually be detected by the sensor 81 (step 57). When the sensor 81 indicates that the ticket is in the exit port 26, the positive exit will be taken from step S7, the drive motor will be turned off and the program will return to the start step, S1.

Figure 10:
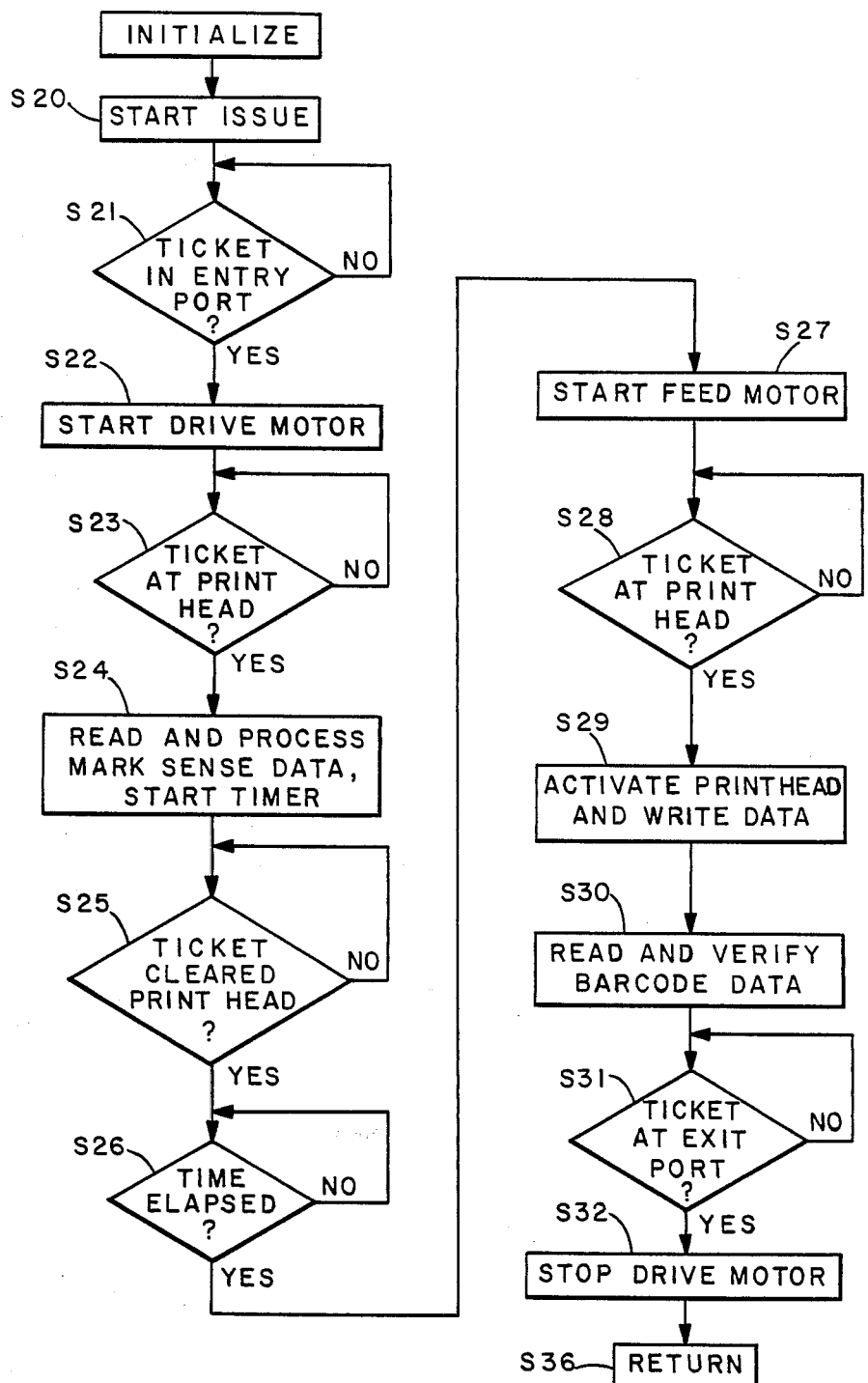
FIG. 10 is a flow diagram showing a sequence of operations characterizing a second operational application of the invention.

FIG. 10 illustrates a process for entering transaction data by means of a ticket premarked by a bettor. In this operation, the operation enters a START ISSUE code, the ticket marked by the bettor is passed through the ticket advancing mechanism, and the information on the ticket is read and processed by the system for being stored and printed onto a blank ticket, which is returned to the bettor. In this regard, the operation starts in step S20 by waiting for an indication that a ticket is being entered into the entry port 27. When such entry is indicated by the sensor 78, the positive exit is taken from step S21 and the drive motor 82 is energized to advance the bettor-marked ticket in the ticket guide 42. The TUP sensor 70 will indicate when the ticket has advanced as far as the thermal printer, at which time the mark-sense component of the reader mechanism 62 will be activated to read the data from the marked ticket. The read data will be processed by sending a copy of it to the central computer 19 and receiving a serial number from the processor. At the same time, the software timer will be started. However, since the diverter gate 72 is left in its first position, the timer will now indicate when the bettor-marked ticket has advanced into the exit port 26. When the timer times out, as indicated by the positive exit from step S26, the feed motor 51 is started when the command from the central processor indicating assignment of the serial number is received. A blank ticket is fed from the hopper 49 into the ticket guide 42; when the ticket advances as far as the thermal printer 60, as indicated by a signal from the TUP sensor 70, the positive exit is taken from program step S28. The remainder of the FIG. 10 operational sequence corresponds essentially to the keyboard-initiated sequence of FIG. 9. In this regard, in step S29, the betting transaction data and serial number are written onto the blank ticket. Concurrent with the writing operation, the bar code on the ticket is read and verified in step S30. Since the diverter gate 72 is in its first position, the ticket is advanced through the exit port 26, the positive exit is taken from step S31, and the drive motor is turned off in step S32. The program then returns to wait for the introduction of another ticket through the entry port 27.

Figure 11:
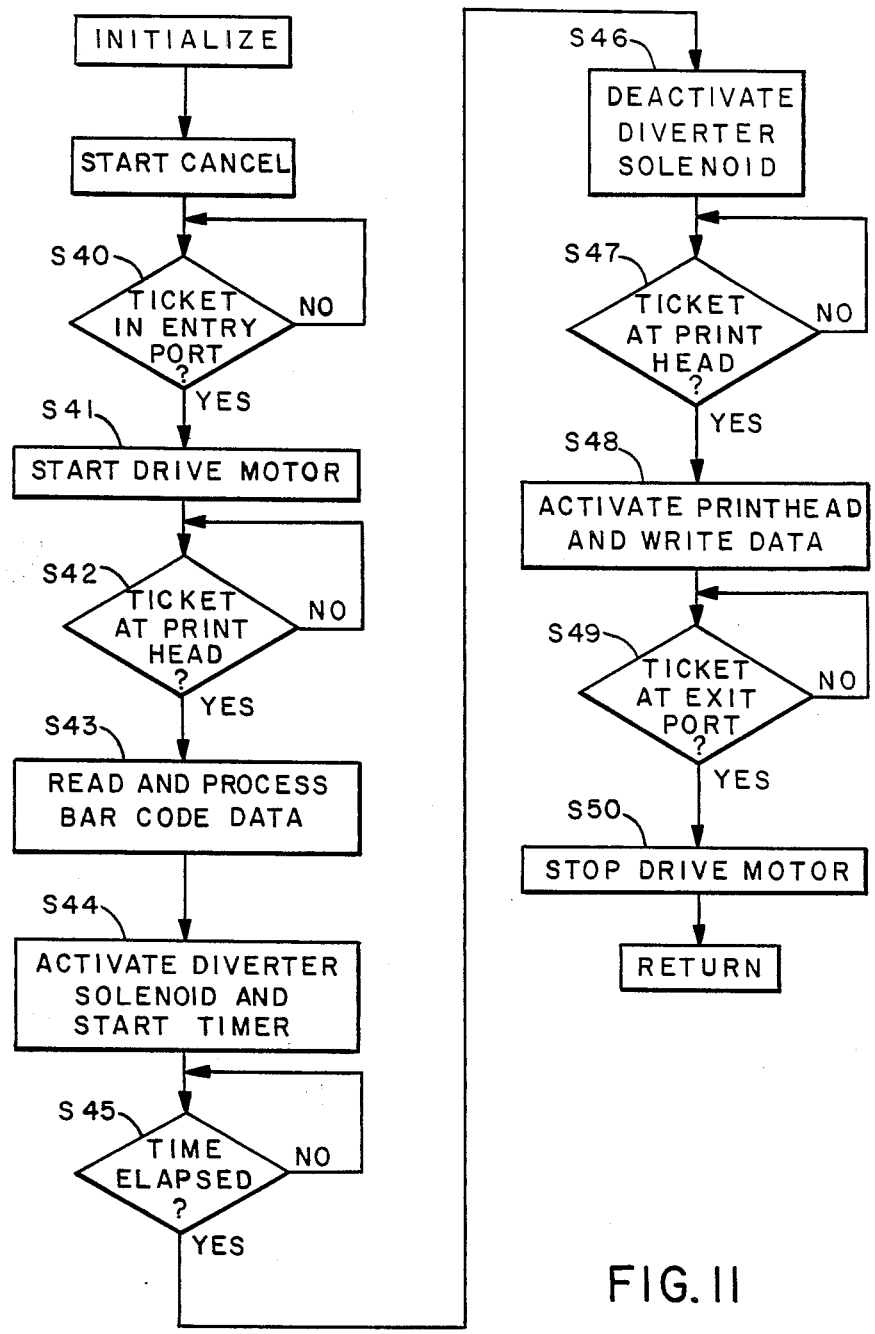
FIG. 11 is a flow diagram showing a sequence of operations characterizing a third operational application of the invention.

It should be evident that the ticket advancing mechanism of the invention in combination with the control mechanization described and illustrated also has the capacity to validate and cancel tickets presented to a terminal operator for payment. In this regard and with reference to FIG. 11, a ticket imprinted with a serial number and betting data and issued in a previous operation by the ticket terminal 18 is placed in the entry port 27. A start cancel is entered by the operator indicating that this is a cancel transaction. The code and entry port sensor activate the drive motor 82, causing it to rotate the drive cylinder 45 (steps S40 and S41). Next, the ticket is advanced past the printhead to the reading mechanism 62, which will be indicated when the ticket passes the TUP sensor 70 in step S42. In step S43, the bar code identifying the serial number of the ticket is read and transmitted to the central computer 19 for validation. At the same time, as shown by step S44, the diverter gate 72 is placed in its second position and the software timer is initiated. While the central computer is confirming the betting data and serial number, the drive cylinder 45 continues to rotate, advancing the ticket in the ticket guide past the diverter gate 72. When the software timer times out in step S45, the diverter gate 72 is returned to its first position (step S46). In the meantime, the central computer 19 returns an indication to the terminal 18 signifying either that the betting data and serial number is valid and merits a payoff or that it is invalid or previously cancelled. Assuming the data is valid, the ticket will be cancelled by activating the thermal printer 60 (step S48) to print a cancellation code on the ticket after the TUP sensor 70 indicates in step S47 that the ticket has advanced through a complete revolution of the guide 42 back to the printing mechanism 60. If the betting data is invalid or the ticket has been previously cancelled, a message will be provided to the terminal operator on the CRT 24. In either case, the ticket will be diverted by the diverter gate out of the ticket guide 42 into the exit port 26. When the exit port sensor 81 senses the presence of the ticket in the port (step S49), the drive motor 82 will be turned off.

It should be evident that the above-described procedures can be conventionally implemented by means of an application program written employing conventional programming techniques for the processor assembly 104.

Obviously, many modifications and variations of the above-described invention are possible in light of these teachings. Therefore, it is to be understood that within the scope of the disclosed invention, it may be practiced other than as specifically described.

We claim:

1. A ticket processing terminal, comprising:
   a housing;
   a substantially cylindrical ticket guide in said housing;
   a single drive cylinder means conforming to and enclosed by said ticket guide for driving a ticket in said ticket guide in a revolutionary feeding direction in response to a drive signal;
   a first, entry port in said ticket guide for inserting an information-bearing ticket into said ticket guide in said feeding direction;
   a second, feed port in said ticket guide spaced from said entry port for feeding a ticket into said ticket guide in said feeding direction;
   reading and writing means adjacent said ticket guide for selectively reading or writing information on a ticket being driven in said feed direction;
   an exit port in said ticket guide for conducting a ticket from said ticket guide, said exit port displaced from said reading and writing means in said feeding direction;
   positionable diverter means conditioned by a positioning signal for moving to a first position to divert a ticket from said ticket guide to said exit port or to a secnd position to guide a ticket in said ticket guide past said exit port in said feeding direction; and
   terminal control means connected to said drive cylinder means, said diverter means, and said reading and writing means for providing said drive and positioning signals, said terminal control means including drive control means to generate said drive signal, reading and writing control means for operating said reading and writing means to read or write information on a ticket in said ticket guide, and diverter control means responsive to said drive control means and to said reading and writing control means for conditioning said positioning signal in sychronism with the reading and writing of a ticket being driven in said ticket guide.

2. The ticket advancing mechanism of claim 1 wherein said reading and writing means includes:
   a thermal printer;
   a bar code reader; and
   a mark-sense reader.

3. The ticket advancing mechanism of claim 1 wherein said drive control means includes an output sensor means for detecting the presence of a ticket in said exit port and for deactivating said drive signal in response to said detecting.

4. The ticket advancing mechanism of claim 1 wherein said reading and writing control means includes a print sensor means for detecting a ticket adjacent said reading and writing means and for selectively operating said reading and writing means to read or write in response to the presence of a ticket adjacent said reading and writing means.

5. The ticket advancing mechanism of claim 4 wherein said diverter control means responds to said reading and writing control means by conditioning said positioning signal to move said diverter means to said second position for a predetermined period of time when said reading and writing means is operated to read.

6. The ticket advancing mechanism of claim 5 wherein said diverter control means conditions said positioning signal to move said diverter means to said first position after said diverter means is in said second position for said predetermined period of time.

7. The ticket advancing mechanism of claim 1 wherein said drive means includes:
   a hollow drive cylinder rotatably disposed in said ticket guide;
   a rotary drive motor fixed to said housing and enclosed by said hollow drive cylinder, said rotary drive motor including a rotatable drive shaft; and
   mounting means for mounting said drive cylinder on said drive shaft.

8. The ticket advancing mechanism of claim 7 wherein said mounting means includes release means for releasably locking said drive cylinder to said drive shaft.

9. A ticket processing apparatus comprising:
   a housing;
   a substantially circular ticket guide in said housing;
   a single drive cylinder means conforming to and enclosed by said ticket guide for driving a ticket in said guide in a feeding direction;
   an entry port means for receiving an informationbearing ticket and for admitting a received ticket into said ticket guide in said feeding direction;

feed port means for feeding a ticket into said ticket guide in said feeding direction;

reading and writing means adjacent said ticket guide for reading information from a ticket received and admitted by said entry port means and for writing said information onto a ticket fed by said feed port means, said reading and writing means displaced from said feed port means in said feeding direction by a first arcuate distance;

exit port means for conducting a ticket from said ticket guide, said exit port means displaced from said feed port means in said feeding direction by a second arcuate distance greater than said first arcuate distance;

diverter means conditioned by a positioning signal for moving to a first position to divert a ticket from said ticket guide to said exit port means or to a second position to guide a ticket in said ticket guide past said exit port means in said feeding direction; and terminal control means connected to said entry port means, said drive cylinder means, said diverter means, and said reading and writing means for providing said drive and positioning signals, said terminal control means including:

drive cylinder control means responsive to said entry port means and said exit port means for providing said drive signal between the time a first ticket is received in said entry port means and the time a second ticket is conducted through said exit port means;

reading and writing control means for selectively operating said reading and writing means to read or write in response to the driving of tickets in said ticket guide;

feed port control means for selectively causing said feed port means to feed a ticket; and diverter control means responsive to said drive control means and to said reading and writing control means for conditioning said positioning signal in synchronism with the reading and writing of tickets being driven in said ticket guide.

10. The ticket processing apparatus of claim 9 wherein said reading and writing means includes:
a thermal printer;
a bar code reader; and
a mark-sense reader.

11. The ticket processing apparatus of claim 9 wherein said drive means includes:
a hollow drive cylinder rotatably disposed in said ticket guide;
a rotary drive motor fixed to said housing and extending into said hollow drive cylinder, said rotary drive motor including a rotatable drive shaft; and
mounting means for rotatably mounting said drive cylinder on said drive shaft.

12. The ticket processing apparatus of claim 11 wherein said mounting means includes release means for releasably locking said drive cylinder to said drive shaft.

13. The ticket processing apparatus of claim 9 wherein said reading and writing control means includes a print sensor means for detecting a ticket adjacent said reading and writing means and for selectively operating said reading and writing means to read or write in response to the presence of a ticket adjacent said reading and writing means.

14. The ticket processing apparatus of claim 13 wherein said diverter control means responds to said reading and writing control means by conditioning said positioning signal to move said diverter means to said second position for a predetermined period of time when said reading and writing means is being operated to write and a ticket admitted through said entry port means is adjacent said reading and writing means.

15. The ticket processing apparatus of claim 14 wherein said reading and writing means is further for reading information on a ticket admitted through said entry port means.

16. The ticket processing apparatus of claim 15 wherein said diverter control means conditions said positioning signal to move said diverter means to said first position after said diverter means is in said second position for said predetermined period of time.

17. A method for reading and writing information on tickets in a ticket advancing mechanism having a circular ticket guide, an entry port for receiving a ticket with written information into the ticket guide, a first port for feeding a blank ticket into the guide, and a second port for conducting a ticket from the ticket guide, comprising the steps of:

receiving a first ticket with written information through said entry port and driving said ticket in said ticket guide toward said second port;

reading said information while said first ticket is being driven but before said first ticket reaches said second port;

diverting said first ticket with said written information out of said ticket guide through said second port;

after said reading step, feeding a second ticket from said first port and driving said ticket in said ticket guide toward said second port;

writing said information on said second ticket while said second ticket is being driven but before said second ticket reaches said second port; and diverting said second ticket to said second port after the completion of said writing.

* * * * *

UNITED STATES PATENT AND TRADEMARK OFFICE
CERTIFICATE OF CORRECTION

PATENT NO. : 4,788,419

DATED : November 29, 1988

INVENTOR(S) : Walters et al

It is certified that error appears in the above-identified patent and that said Letters Patent is hereby corrected as shown below:

Claim 2, Column 12, line 17, please delete "advancing mechanism" and insert therefor --processing terminal--;
Claim 3, column 12, line 22, please delete "advancing mechanism" and insert therefor --processing terminal--;
Claim 4, column 12, line 27, please delete "advancing mechanism" and insert therefor --processing terminal--;
Claim 5, column 12, line 34, please delete "advancing mechanism" and insert therefor --processing terminal--;
Claim 6, column 12, line 41, please delete "advancing mechanism" and insert therefor --processing terminal--;
Claim 7, column 12, line 46, please delete "advancing mechanism" and insert therefor --processing terminal--;
Claim 8, column 12, line 55, please delete "advancing mechanism" and insert therefor --processing terminal--;
Claim 9, column 12, line 64, between "feeding direction" and the semicolon, please insert --in response to a drive signal--; and
Claim 11, column 13, line 49, please insert --cylinder-- between "drive" and "means".

Signed and Sealed this

Tenth Day of July, 1990

*Attest:*

HARRY F. MANBECK, JR.

*Attesting Officer*   *Commissioner of Patents and Trademarks*